Dec. 26, 1950 J. HERTRICH 2,535,854
FRICTION BRAKE CONTROL SYSTEM FOR
CENTRIFUGAL MACHINES OR THE LIKE
Filed Aug. 21, 1942 2 Sheets-Sheet 1

INVENTOR.
JOSEPH HERTRICH
BY
Hammond & Littell
ATTORNEYS

INVENTOR.
JOSEPH HERTRICH
BY Hammond & Littell
ATTORNEYS

Patented Dec. 26, 1950

2,535,854

UNITED STATES PATENT OFFICE 2,535,854

FRICTION BRAKE CONTROL SYSTEM FOR CENTRIFUGAL MACHINES OR THE LIKE

Joseph Hertrich, Hamilton, Ohio, assignor to The Western States Machine Company, Hamilton, Ohio, a corporation of Utah Application August 21, 1942, Serial No. 455,678

21 Claims. (Cl. 188—151)

This invention relates to a friction brake control system intended primarily for use in the braking or deceleration of heavy rotating bodies, such as high speed sugar centrifugals and other heavy duty machines which operate in a cyclical manner with frequent accelerations and decelerations to and from high speeds of rotation. It also relates to the control of friction clutches for accelerating heavy rotary bodies, and to new devices for regulating the pressure supplied to a fluid-pressure-operated brake, clutch or the like.

The friction brakes of high speed centrifugals, as heretofore made and used, have been applied by the force of springs or of liquid or air under pressure so as to exert an approximately uniform braking torque on the revolving mass from the start to the end of each braking period. Similarly, friction clutches commonly have been made to work under a more or less uniform operating force. The braking operation, for example, involves the conversion of a great deal of kinetic energy into heat through the friction of the brake. This heat is not dissipated satisfactorily in the operation of some heavy-duty high speed centrifugals, even though efficient water cooling systems and braking elements of very large surface area be used. In extreme cases, the brake linings become over-heated and wear out after only a few weeks of service; and the brake drums may even become "checked" or cracked from excessive heat, such that they must be replaced to avoid danger of breaking. As brake linings become over-heated the braking period of each centrifugal cycle is extended, at a loss of machine capacity, and the replacement of worn out linings entails objectionable expenses and interruptions to service.

It is, therefore, the object of my present invention to provide a new and improved control system for friction brakes, friction clutches, and the like by which to alleviate problems of the kind just described. Another object is to effect the deceleration or acceleration of heavy rotating masses with less intensive generation of heat than heretofore. Another object is to provide such a system which will result in more uniform heat generation during the braking or clutching period than heretofore, so that the heat generated may be dissipated more readily by suitable brake cooling means. U. S. Patent No. 2,096,341 of Eugene Roberts, reissued under No. Re. 22,686, discloses an efficient cooling means suitable for centrifugal brakes. Still another object of the invention is to provide a system for retarding or accelerating the rotation of high speed centrifugal machines, or of other heavy bodies or masses, which reduces the danger of over-heating the friction elements without prolonging the period required for them to effectuate the desired speed change.

A further object of the invention is to provide novel means or devices for increasing at a regulated rate, from a relatively low initial value, the fluid pressure supplied to an object from a source of relatively high fluid pressure.

I have observed operations of heavy-duty high speed centrifugal machines equipped with friction brakes in which the heat generation during braking was so intense that the brake linings smoked and the friction surfaces of the brake drum became almost red hot, notwithstanding the presence of ample cooling water against the inside wall of the drum. From such observations I concluded that the rate of heat generation during braking was greater than the rate of heat transmission through the wall of the brake drum, such that over-heating necessarily occurred and could be avoided with known equipment only by reducing the braking force and extending the braking period, at a loss of machine capacity. I then conceived, however, that the intense heat peaks might be attributable to the following conditions: When the force applying the brake—i. e., the braking torque—is kept approximately constant the heat or friction generated by the brake becomes a direct function of speed. Hence, high heat peaks may be obtained in the early stages of braking, when the heavy mass to be decelerated is rotating at very high speeds; while the heat generated toward the end of the braking period, when the speed of the mass has been reduced, may be comparatively low. Following this I conceived that the problem of excessive heat peaks might be overcome if the initial braking force were established at a low enough value to keep the heat generation at the fastest speeds within the heat-dissipating capacity of the brake system, and if the braking force were increased substantially in the course of the braking operation, as the speed of the mass become substantially reduced. Such a practice would cause more uniform heat generation during the braking period and reduce heat peaks and over-heating problems, but it need not prolong the braking operation because a faster rate of deceleration could be obtained in the lower range of speeds, sufficient to offset the slower deceleration at higher speeds.

The present invention is based upon these and other conceptions and embodies the same in new methods and apparatus for the control of friction brakes, friction clutches, or the like, as set forth in the appended claims and as described more particularly hereinafter with reference to the specific embodiments illustrated in the accompanying drawings, wherein:

Figure 4:
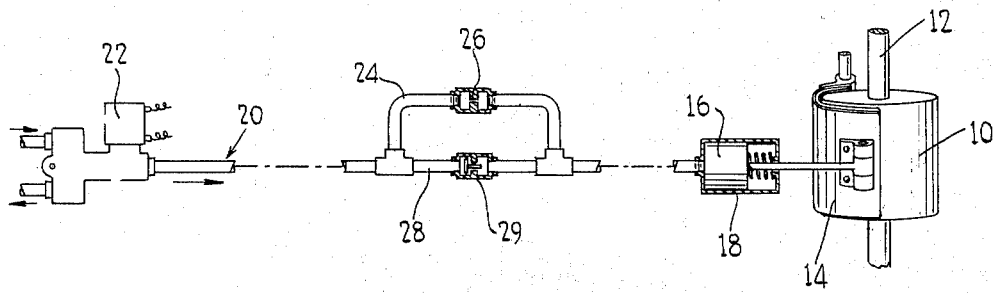
Figure 5:
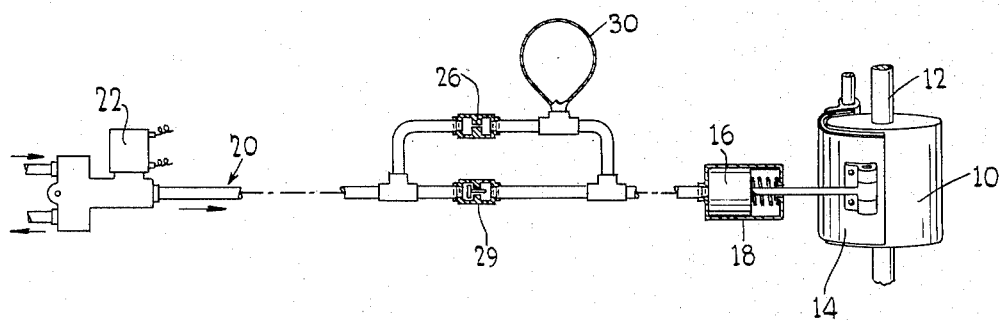
Figure 6:
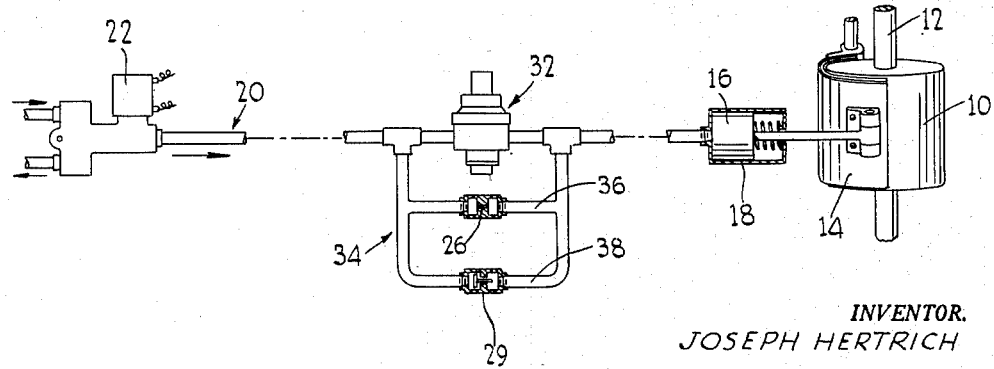

Figures 4, 5 and 6, respectively, are diagrammatic illustrations of modified brake control systems embodying the invention.

The systems provided by this invention, broadly speaking, utilize a new method for controlling heat generation during the changing of speed of a heavy revolving body by friction means such as a friction brake or clutch, in which the brake, for example, is applied with a limited force during the fastest rotation of the body and in which the braking force is substantially increased as the speed of the body is reduced. The initial braking force preferably is predetermined in such relation to the speed and mass of the body as to keep the heat generation within the heat-dissipating capacity of the brake system, and as the deceleration proceeds the braking force preferably is increased in timed relation to the decrease in the speed of the body, such that the desired braking efficiency and short braking period are obtained without increasing the rate of heat generation. In the case of a friction clutch the relation of the machine speed to the force or pressure of the friction means is simply reversed.

Figure 1:
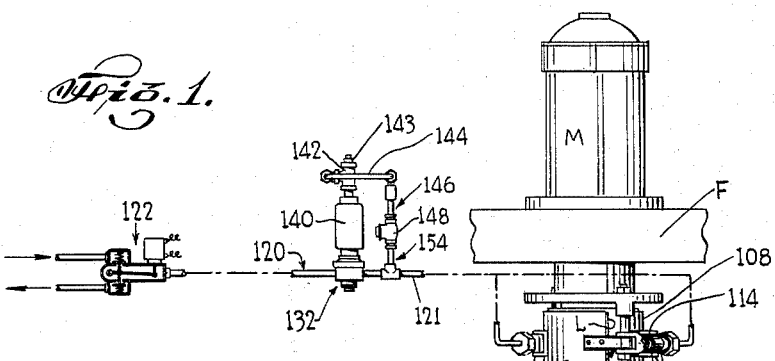
Figure 1 shows a heavy-duty centrifugal machine equipped with a friction brake and a brake control system according to a preferred embodiment of the invention.
Figure 3:
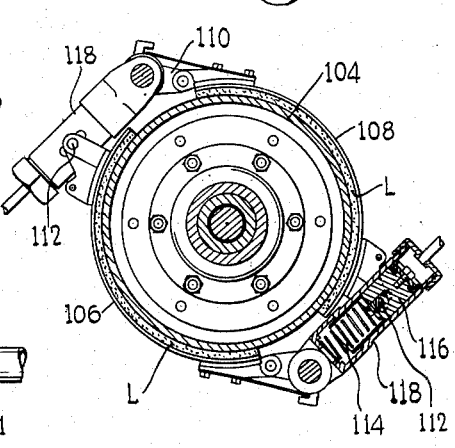
Figure 3 is an enlarged sectional view showing details of the principal control elements of Figure 1.
Figure 2:
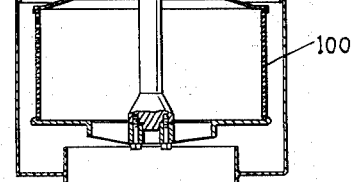
Figure 2 is a horizontal section showing the braking members and the air cylinders which apply the brake.

According to the preferred embodiment illustrated in Figures 1 to 3, the braking force is increased gradually and at an approximately constant rate from a predetermined minimum at the start of braking to a predetermined maximum reached at some definite stage of the braking operation, say when the rotating body has been decelerated to about half its initial speed.

According to other embodiments of the invention, the initial braking force may be increased abruptly at a suitable stage of the deceleration, such as by the use of two or more springs to apply the brake, one to become active after another; or a gradual increase from a very low initial braking force may be obtained in various ways, e. g., as illustrated in Figures 4 and 5 of the drawing; or a gradual increase from any desired initial braking force may be obtained as illustrated in Figure 6.

Referring first to the embodiment of Figure 4, a brake drum 10 carried by a shaft 12 is shown diagrammatically as working with a brake band 14 which is connected to a plunger 16 of an air cylinder 18 so as to be applied by the force of compressed air admitted into the air cylinder. The compressed air is supplied through a pressure line 20 which has a cut-off valve 22, such as a conventional three-way solenoid valve, to control the setting and unsetting of the brake. Air pressure is transmitted from valve 22 to cylinder 18 through a by-pass 24 having a small bleeder hole 26 which throttles the air flow and so delays the building up of full pressure in the cylinder 18. A pressure release line 28 has a one-way check valve 29 therein which permits instantaneous release of pressure from the air cylinder when the pressure line is vented upon the closing of valve 22.

Figure 5 shows an embodiment similar to that of Figure 4 in which, however, the brake is adapted to be actuated by oil or other liquid under pressure. Here the conduit leading from the bleeder hole 26 to cylinder 18 is connected with a sealed air chamber 30 so that liquid bleeding through the hole 26 builds up full pressure in the pressure cylinder 18 gradually, and only as the air in chamber 30 becomes compressed.

The embodiments of Figures 4 and 5 may be modified, so as to obtain a predetermined initial braking force of any desired value, by transmitting fluid pressure from the cut-off valve 22 to the brake cylinder 18 through a suitable pressure-regulating valve, and utilizing the bleeder hole action to increase the pressure established by the pressure regulating valve. One arrangement of that type is shown diagrammatically in Figure 6, wherein the pressure line 20 is connected with the cylinder 18, directly through a pressure-regulating valve 32 and indirectly through a by-pass 34 having parallel branches 36 and 38, one with the bleeder 26 therein and the other with the check valve 29. Using, for example, a compressed air supply at a pressure of 80 pounds per square inch, the valve 32 may be set to give an initial braking force corresponding to a pressure of 40 pounds per square inch in cylinder 18, when the cut-off valve 22 is opened, after which pressure bleeds gradually through the bleeder hole 26 until a maximum pressure approximating 80 pounds per square inch has been attained, say after 20 seconds or so of braking.

Another arrangement of the type last referred to is represented by the preferred embodiment of Figures 1 to 3, which has certain features and advantages not common to the other illustrated embodiments. In particular, the rate of increase of the braking force is held constant at any selected value; and the full braking force is obtained even where the air cylinder leaks pressure, which may not be true of other forms where the full force of the brake is reached only by the slow bleeding of fluid through the bleeder hole. Figures 1 to 3 show the invention as applied in the preferred manner to an air-operated brake on a high speed sugar centrifugal, and they also show a bleeder means and a check valve, or pressure-release means, as being combined in a common unit for simplicity and economy of construction.

Referring to Figure 1, the centrifugal machine comprises a basket 100 suspended by a spindle 102 from a gyratory head supported below framework F. A motor M drives the spindle and basket through intermediate connections not shown. A brake drum 104 rotates with the spindle and basket assembly and cooperates with brake bands 106 and 108 (Figure 2), which have suitable friction linings L. One end of each brake band is anchored on a bracket 110, and the other end is connected by a bracket and pin 112 with the piston 116 of an air cylinder 118. A spring 114 in each cylinder tends to move the brake to the "off" or released position. Compressed air from a suitable source (not shown) is adapted to be admitted into the cylinders 118 through a supply line 120. A cut-off valve 122, such as a suitable three-way solenoid valve, controls the air supply.

As shown in Figures 1 and 3, the control system further includes a variable pressure-regulating valve 132 across the air line 120 between the cut-off valve 122 and the air cylinders 118.

This regulating valve has a diaphragm 134 under the pressure of a spring 136 and an adjustable nut 138 in back of the spring to vary the initial pressure established by the valve. The diaphragm is connected in known manner to valve element 133, which normally is held open by spring 136 to establish communication between air lines 120 and 121. Assuming that the compressed air supply is under a pressure of 80 pounds per square inch, the regulating valve 132 may be set to establish an initial pressure, for example, of 40 pounds per square inch in the conduit section 121 leading from the valve into the air cylinders 118. Upon the establishment of that initial pressure, which acts upon the under side of diaphragm 134, the force of spring 136 will be overcome and the valve element 133 will close.

The regulating valve, however, is also provided with an air chamber 140 which communicates with the upper side of the diaphragm 134, and with conduit 121 and cylinder 118 through a T section 142, tubing 144, tubing 146, valve body 148, and tubing 154. The valve body 148 encloses a check valve 149 which normally is held on its seat 150 and which is bored axially and provided with a capillary tube 152 in communication with the bore to serve as a pressure bleeder. Tube 152, for example, is formed with a hole approximately .010" in diameter. The tubing sections 146 and 154, respectively, hold air filters 147 and 155, which protect the capillary tubing 152 from obstruction by dirt particles.

In the operation of this system, the cut-off valve 122 is opened and a certain pressure, say 40 pounds per square inch, is immediately established in conduit 121 and the brake cylinders 118, according to the setting of the pressure-regulating valve 132. The brake goes on under a corresponding initial braking force, while the centrifugal is rotating at full speed. At the same time air begins to bleed through the capillary tubing 152 into the air chamber 140, and as the bleeding continues the pressure in chamber 140 increases. This increased pressure in chamber 140, however, is additive to the pressure of spring 136 against the upper side of the diaphragm 134, so that a progressive change in the action of the pressure-regulating valve takes place automatically until the pressure in the cylinders 118 becomes the same as that of the compressed air supply, at which time the maximum braking force is attained. Thus, using an air supply under 80 pounds pressure and a setting of valve 132 for an initial pressure of 40 pounds, when the pressure in chamber 140 has reached 10 pounds the pressure in the brake cylinders will be 50 pounds; and when the pressure in chamber 140 is 40 pounds or higher the pressure in the brake cylinders will equal the maximum, or 80 pounds. In this way the braking force effective at the top speed of the centrifugal may be established at a value that avoids over-heating of the brake during the early stages of deceleration, and as the centrifugal is reduced in speed by the brake the braking force is increased automatically to the predetermined maximum force of the system, without encountering excessive heat peaks at any stage of the braking operation.

With this system, furthermore, the pressure differential between line 121 and chamber 140 is constant until the pressure in line 121 becomes approximately the same as that of the air supply, which means that the pressure differential across the bleeder hole and the flow rate through the bleeder hole are approximately constant. The increase of the braking force from one value to another therefore occurs at a definite rate for any particular size of the bleeder, which rate and the total time required may be established as desired without regard to varying pressure conditions in the system.

Leakage of air from the air cylinders 118 does not affect the control, because any momentary drop of pressure in line 121 causes the pressure-regulating valve to open farther and supply more air to compensate for the leakage.

The check valve 149 allows a quick return of pressure from chamber 140 to line 121 at the moment the cut-off valve 122 is closed and line 120 is vented to release the brake. This keeps the pressure in chamber 140 from ever being much greater than the pressure in line 121, which protects the diaphragm 134 against possible rupture by excessive pressure from chamber 140 when the main air supply is cut off.

The connection of tubing 144 with chamber 140 through the T piece 142 permits a plug 143 at the end of the T piece to be removed and a screw driver or other tool to be inserted to adjust the nut 138 and the initial pressure setting of valve 132.

While I have illustrated and described several embodiments of my invention, it will be understood that the new features and principles herein disclosed are not restricted thereto but may be embodied in various other forms within the purview of the appended claims. For example, such features and principles may be used, if desired, for the control of heavy-duty friction clutches, to avoid excessive heat peaks in the acceleration of heavy masses from low to high speeds of rotation.

I claim:

1. A braking system comprising a friction brake, an air cylinder to apply the brake, and means for supplying compressed air to said cylinder, wherein said means includes a variable pressure-regulating valve operative to establish a predetermined initial pressure in said cylinder, together with an air chamber operative upon an increase of pressure therein to increase the pressure established by said valve, and means including a bleeder hole for gradually transmitting pressure acting upon said cylinder into said chamber.

2. A braking system comprising a friction brake, an air cylinder to apply the brake, and means for supplying compressed air to said cylinder, wherein said means includes a variable pressure-regulating valve operative to establish a predetermined initial pressure in said cylinder, together with an air chamber operative upon an increase of pressure therein to increase the pressure established by said valve, and means including a bleeder hole for gradually transmitting pressure acting upon said cylinder into said chamber, said last-recited means also including a check valve to release pressure from said chamber when the air supply to said cylinder is cut off.

3. In a braking system comprising a friction brake, an air cylinder to apply the brake, a conduit to lead compressed air into said cylinder and a cut-off valve in said conduit, a variable pressure-regulating valve in said conduit between said cut-off valve and said cylinder and comprising a spring-pressed diaphragm and a pressure chamber sealed above and in communication with said diaphragm, tubing connecting said chamber with said conduit between said pressure-regulating valve and said cylinder, bleeder means in said tubing to transmit pressure established by said pressure-regulating valve gradually into said chamber, and a check valve in said tubing to release pressure from said chamber upon the venting of said conduit.

4. A heavy rotary machine including a friction means applicable to a rotary part of the machine to change its speed, an air cylinder to apply the friction means, and means for supplying compressed air to said cylinder, wherein said supplying means comprises a pressure-regulating valve operative to establish a predetermined minimum pressure in said cylinder when said air supplying means is rendered active, together with an air chamber operative upon an increase of pressure therein to increase the pressure established by said valve, and means including an air conduit having a bleeder hole therein for gradually transmitting pressure acting upon said cylinder into said chamber.

5. A heavy rotary machine including friction means applicable to a rotary part of the machine to change its speed, an air cylinder to apply the friction means and means for supplying compressed air to said cylinder, wherein said supplying means comprises a pressure-regulating valve operative to establish a predetermined initial pressure in said cylinder when said air supplying means is rendered active, together with an air chamber operative upon an increase of pressure therein to increase the pressure established by said valve, and means including an air conduit having a restricted passage therein for gradually bleeding air pressure established by said valve into said chamber, said conduit also including a check valve to release air pressure from said chamber when the compressed air supply is cut off.

6. In a heavy rotary machine comprising fluid-pressure-operated friction means applicable to a rotary part of the machine to change its speed, means for controlling the operation of said friction means comprising a pressure fluid conduit having a pressure-regulating valve therein and a portion leading from the outlet side of said valve to said friction means, said valve having yieldable means urging the same open with a predetermined force and means responsive to the fluid pressure in said outlet portion to urge the valve closed in counteraction to said yieldable means, secondary means for applying fluid pressure to said valve so as to urge the same open with force additive to said predetermined force, and means for gradually building up fluid pressure in said secondary means over a substantial time interval, so that the pressure in said outlet portion may be increased correspondingly during said interval.

7. In a heavy rotary machine comprising fluid-pressure-operated friction means applicable to a rotary part of the machine to change its speed, means for controlling the operation of said friction means comprising a pressure fluid conduit having a pressure-regulating valve therein and a portion leading from the outlet side of said valve to said friction means, said valve having yieldable means urging the same open with a predetermined force and means responsive to the fluid pressure in said outlet portion to urge the valve closed in counteraction to said yieldable means, secondary means for applying fluid pressure to said valve so as to urge the same open with force additive to said predetermined force, and a branch conduit containing a restricted passage to bleed pressure fluid slowly from said outlet portion to said secondary means, so that the pressure in the latter increases gradually at a substantially constant rate and the pressure in said outlet portion increases correspondingly from an initial value established by said predetermined force to a higher value supplied in said line.

8. Apparatus as described in claim 7, said branch conduit having a return passage arranged to bypass said restricted passage and a valve across said return passage operative to release the fluid pressure in said secondary means when the same exceeds the fluid pressure in said outlet portion.

9. In a heavy rotary machine comprising fluid-pressure-operated friction means applicable to a part of the machine to change its speed of rotation, means for controlling the operation of said friction means comprising a pressure fluid conduit having a pressure-regulating valve therein and a portion leading from the outlet side of said valve to said friction means, said valve having a spring to urge the same open with a predetermined force and a diaphragm responsive on one side to fluid pressure in said outlet portion to urge the valve closed, a fluid pressure chamber communicating with other side of said diaphragm, and means for gradually building up fluid pressure in said chamber.

10. Apparatus as described in claim 9, said means for gradually building up fluid pressure in said chamber comprising a branch conduit connecting said outlet portion with said chamber and containing a restricted passage operative to bleed fluid slowly into the chamber when the pressure therein is less than the pressure in said outlet portion.

11. Apparatus as described in claim 10, said branch conduit having a return passage arranged to bypass said restricted passage and a check valve across said return passage operative to release the fluid pressure in said chamber when the same exceeds the fluid pressure in said outlet portion.

12. Apparatus as described in claim 11 wherein said restricted passage is located in the movable element of said check valve.

13. In a heavy rotary machine comprising fluid-pressure-operated friction means applicable to a rotary part of the machine to change its speed of rotation, means for controlling the operation of said friction means comprising a pressure fluid conduit having a pressure-regulating valve therein and a portion leading from the outlet side of said valve to said friction means, said valve having a spring to urge the same open with a predetermined force and a diaphragm responsive on one side to fluid pressure in said outlet portion to urge the valve closed, a fluid pressure chamber communicating with the other side of said diaphragm, means for gradually building up fluid pressure in said chamber to urge the valve open with force additive to the force of said spring, and means for adjusting the setting of said spring to change the force thereof.

14. Apparatus as described in claim 13, wherein said spring is a compression spring bearing at one end against said other side of the diaphragm and said adjusting means includes a member screw threaded in a part of said chamber, bearing against the other end of said spring, forming a passage for pressure fluid, and accessible through said chamber for adjustment to change the compression of the spring.

15. A fluid pressure regulating device comprising a pressure fluid conduit having a valve therein and inlet and outlet portions on the respective sides of said valve, yieldable means urging the valve open with a predetermined force, means responsive to the fluid pressure in said outlet portion to urge the valve closed in counteraction to said yieldable means, secondary means for applying fluid pressure to said valve so as to urge the same open with force additive to said predetermined force, and means for gradually building up fluid pressure in said secondary means over a substantial time interval so that the pressure in said outlet portion may be increased correspondingly during said interval.

16. A device as described in claim 15 wherein the means for building up fluid pressure comprise a conduit containing a restrictive passage arranged to bleed fluid slowly from said outlet portion to said secondary means, so that the pressure increase may occur at a substantially constant rate dependent upon the size of said passage.

17. A fluid pressure regulating device comprising a pressure fluid conduit having a valve therein and inlet and outlet portions on the respective sides of said valve, said valve having a spring to urge same open with a predetermined force and a diaphragm responsive on one side to fluid pressure in said outlet portion to urge the valve closed, a fluid pressure chamber communicating with the other side of said diaphragm, and a branch conduit connecting said chamber with said outlet portion and containing a restricted passage operative to bleed fluid slowly into the chamber from said outlet portion when the pressure in the latter exceeds the pressure in the chamber.

18. A device as described in claim 17 wherein said branch conduit has a return passage arranged to bypass said restricted passage and a check valve across said return passage operative to release the pressure in said chamber when the same exceeds the pressure in said outlet portion.

19. A device as described in claim 18, said restricted passage being located in the movable element of said check valve.

20. In a braking system for a heavy centrifugal machine comprising a shaft connected for rotation with the basket of the machine, a brake drum on said shaft and a friction device applicable to said drum for decelerating the machine from a high speed of rotation at frequent intervals, fluid pressure responsive means connected with said device for applying the same, a fluid pressure conduit connected with said applying means for conducting fluid pressure thereto from a source of a predetermined maximum fluid pressure, a pressure cutoff valve in said conduit, a pressure-regulating device in said conduit between said cutoff valve and said applying means, said regulating device being operative upon the opening of said valve to transmit to said applying means a limited pressure much below said maximum pressure but sufficient to decelerate the machine, and pressure bleeding means connected with said conduit and rendered operative upon the opening of said valve to increase the pressure acting upon said applying means gradually from said limited pressure to approximately said maximum pressure during a major interval of the deceleration period, so that the rate of brake heat generation in decelerating the machine from said high speed is nearly the same at the end of said interval as it is at the beginning thereof.

21. In a braking system for a heavy centrifugal machine comprising a shaft connected for rotation with the basket of the machine, a brake drum on said shaft and a friction device applicable to said drum for decelerating the machine from a high speed of rotation at frequent intervals, fluid pressure responsive means connected with said device for applying the same, a fluid pressure conduit connected with said applying means for conducting fluid pressure thereto from a source of a predetermined maximum fluid pressure, a pressure cutoff valve in said conduit, a pressure-regulating device in said conduit between said cutoff valve and said applying means, said regulating device being operative upon the opening of said valve to transmit to said applying means a limited pressure much below said maximum pressure but sufficient to decelerate the machine, said conduit having a branch line interconnecting portions of it on opposite sides of said regulating device to bypass the latter and a pressure bleeding device in said branch line operative upon the opening of said valve to increase the pressure acting upon said applying means gradually from said limited pressure to approximately said maximum pressure during a major interval of the deceleration period, so that the rate of brake heat generation in decelerating the machine from said high speed is nearly the same at the end of said interval as it is at the beginning thereof.

JOSEPH HERTRICH.

REFERENCES CITED

The following references are of record in the file of this patent:

UNITED STATES PATENTS

| Number | Name | Date |
|---|---|---|
| 468,917 | Moore | Feb. 16, 1892 |
| 678,352 | See | July 9, 1901 |
| 865,732 | Vandernell et al. | Sept. 10, 1907 |
| 960,055 | Sundh | May 31, 1910 |
| 1,088,744 | Thurber | Mar. 3, 1914 |
| 1,390,597 | Westinghouse | Sept. 13, 1921 |
| 1,733,898 | Moore | Oct. 29, 1929 |
| 2,090,460 | Schaum | Aug. 17, 1937 |
| 2,096,341 | Roberts | Oct. 19, 1937 |
| 2,453,854 | Olcott | Nov. 16, 1948 |